United States Patent [19]

Bradford et al.

[11] 4,375,431

[45] Mar. 1, 1983

[54] ALUMINUM TREATED PROTEINS

[75] Inventors: Marion M. Bradford; Frank T. Orthoefer; Kenneth N. Wright, all of Decatur, Ill.

[73] Assignee: A. E. Staley Manufacturing Company, Decatur, Ill.

[21] Appl. No.: 334,619

[22] Filed: Dec. 28, 1981

[51] Int. Cl.³ .......................... A23J 1/14; C07G 7/00; C07G 7/04

[52] U.S. Cl. ........................... 260/123.5; 260/112 R; 260/113; 426/656; 426/42; 426/44; 435/69; 435/70

[58] Field of Search ................ 260/113, 123.5, 112 R; 426/656, 42, 44; 435/69, 70

[56] References Cited

U.S. PATENT DOCUMENTS

| | | | |
|---|---|---|---|
| 820,824 | 5/1906 | Roehr | 210/737 |
| 2,377,853 | 6/1945 | Boyer et al. | 260/123.5 |
| 2,549,526 | 4/1951 | Rowe | 260/123.5 |
| 3,361,574 | 1/1968 | Paulsen | 260/123.5 X |
| 3,736,147 | 5/1973 | Iacobucci et al. | 99/17 |
| 3,966,971 | 6/1976 | Morehouse et al. | 426/44 |
| 3,995,071 | 11/1976 | Goodnight, Jr. et al. | 260/123.5 X |
| 4,072,670 | 2/1978 | Goodnight, Jr. et al. | 426/656 X |
| 4,212,799 | 7/1980 | Nuzzolo et al. | 260/123.5 |
| 4,216,144 | 8/1980 | Ashmead | 260/115 |
| 4,234,620 | 11/1980 | Howard et al. | 426/656 |

*Primary Examiner*—Howard E. Schain
*Attorney, Agent, or Firm*—M. Paul Hendrickson; Charles J. Meyerson

[57] ABSTRACT

Phytate-containing proteinaceous materials are treated with trivalent aluminum to alter the physical, chemical, metabolic, functional and nutritional values of the protein. Protein derived from phytate-containing seed materials treated with trivalent aluminum possess improved solvent solubility, protease digestability, reduced thermophiles and trypsin inhibition reduction, low viscosity, trace mineral bioavailability, etc. without requiring phytate or phytic acid removal. The aluminum treatment may be conducted at numerous protein manufacturing stages with a wide variety of different materials. Phytate-containing proteins may be effectively extracted at acid pH levels in the presence of trivalent aluminum without sacrificing recoverable protein yields.

25 Claims, No Drawings

ALUMINUM TREATED PROTEINS

BACKGROUND OF THE INVENTION

Certain proteinaceous materials of a vegetative origin are known to contain appreciable levels of phytates and phytic acid. Vegetable proteins from corn, wheat, rice, soybeans, peanut meal, sesame meal, rape seed meal, cottonseeds, lima beans, navy beans, barley, oats and sunflower seeds have been reported as containing phytic acid and phytates. Although the phytates and phytic acid content in excess of 7% has been reported, the content for cereal and oil seeds typically ranges from about 1% to about 5%.

Phytates and phytic acid are known to have a deleterious effect upon the nutritional quality of foodstuffs. Phytates and phytic acid form metal-phytate and phytate-protein complexes. The metal-phytate complexes are reportedly responsible for dietary deficiencies of essential metals such as zinc, magnesium, manganese, calcium, copper, iron, etc.

Numerous techniques for removing phytates and phytic acid from proteinaceous materials have been reported. Morehouse et al. (U.S. Pat. No. 3,966,971) reports removing phytate by treating vegetable protein source materials with an acid-phytase. Generally, a portion of the phytates are unaffected by the phytase treatment. In a patent issuing to Iacobucci et al. (U.S. Pat. No. 3,736,147), there is disclosed a process for removing phytic acid by ultrafiltration at a pH 2.0–4.5 in the presence of a large excess of divalent cations, such as calcium and magnesium ions. Iacobucci et al. report that the stoichiometric displacement of the phytic acid from the soy proteins:phytic acid complex at pH 3.0 requires an excess of at least 70 equivalents of calcium ions per equivalent of charged basic group present in the protein. Goodnight, Jr. et al. (U.S. Pat. Nos. 4,072,670 and 3,995,071) report the preparation of soy protein isolates of a reduced phytic acid-phytate content by treating aqueous soy protein extracts at a pH 10.5 or higher to insolubilize phytates and phytic acid. The insoluble phytates and phytic acid components are separated from the soy protein extract to provide a low-phytate isolate. The treatment of soy proteins at a pH 10.0 or higher results in the formation of undesirable by-products which adversely affect the isolates nutritional quality.

Other patents have treated proteinaceous materials with metal hydroxides for purposes unrelated to phytate removal. U.S. Pat. No. 4,216,144 by Ashmead discloses the preparation of iron proteinates or chelates of iron from hydrolyzed vegetable proteinaceous materials. An early patent by C. Roehr (U.S. Pat. No. 820,824) discloses a method for separating proteins from fatty materials in proteinaceous materials by precipitating the protein with water-insoluble and alcohol-soluble metal hydroxides in alcohol such as the hydroxides of aluminum, copper, zinc, nickel, cobalt and silver. U.S. Pat. No. 4,212,799 issuing to C. Nuzzolo et al. discloses treating sunflower meals with aluminate ions at a pH 10.5 to complex certain polyphenolics and prevent their oxidation of quinones. Throughout the sunflower meal treatment the aluminum is maintained in solution. The aluminum is maintained in solution during the isoelectric precipitation of the sunflower proteins at pH 5.0 via water-soluble aluminum complexing agents such as citrate.

Unfortunately the phytate and phytic acid removal proposals provide an ineffective and uneconomical solution to the phytate and phytic acid problem. Processes relying upon pH 10.0 or higher produce undesirable by-products. The divalent metal addition processes substantially increase capital equipment, raw material and waste material disposal costs. The techniques required for phytate and phytic acid removal unduly complicate the manufacturing process and require extensive modification to existing manufacturing facilities and process.

In the manufacture of proteinaceous materials, the industry has long-sought a simple and direct method to alleviate problems associated with phytates and phytic acid. A manufacturing process which could be effectively and easily integrated into existing manufacturing facilities without requiring extensive processing and equipment alterations would provide definitive advantages. An economical and effective manufacturing process adapted to overcome the phytate and phytic acid complexing problems would also significantly enhance the nutritional value of vegetable proteins. A significant technological advance within the field of vegetable protein would arise by a system that relied upon an additive which facilitated the manufacture and enhanced the nutritional and functional efficacy of the protein product without requiring phytic acid or phytate removal.

DESCRIPTION OF THE INVENTION

According to the present invention, there is provided a method for preparing a protein composition of a reduced protein-phytate complex content from phytate-containing proteinaceous materials, said method comprising adding to a proteinaceous material, which contains protein-phytate complexes, at least 0.5 mole of trivalent metal for each mole of phytate contained within said material, converting the protein-phytate complex with said trivalent metal to provide a protein composition of a reduced protein-phytate complex content, and recovering said protein composition.

The invention generally applies to phytate-containing proteinaceous materials. In such phytate-containing proteinaceous materials, a significant portion of the protein is undesirably complexed with the phytate. Proteinaceous materials of a seed origin include vegetable proteins obtained from nonoleaginous seed such as wheat, rice, barley, oats, etc. Also included are oleaginous seed materials such as corn, soybeans, black beans, broad beans, horse beans, brown beans, peanuts, sesame seed, rape seed, cottonseed, lima beans, sunflower seeds, etc. Phytate-containing proteinaceous materials, on a dry substance basis (d.s.b.), will generally contain 5% by weight or more protein and from about 0.25% to about 5% by weight or more phytate and phytic acid on a dry protein weight basis. The invention applies to a broad spectrum of proteinaceous materials having a protein content ranging from whole seed (e.g. corn 7–8% protein) to vegetable isolates with a protein content in excess of 95%. It is particularly adapted towards the processing of proteinaceous materials obtained from oleaginous seed materials. It applies to leguminous proteinaceous materials of at least 30% by weight protein content (d.s.b.) and especially those containing 40% or more protein are converted by the trivalent aluminum treatment. Illustrative leguminous materials containing at least 40% protein include the defatted meals, flours, protein concentrates (i.e. 70% or more protein) or protein isolates (90% or more protein) of peanuts, rape seed, cottonseed, soybeans, mixtures thereof and the like.

The phytate-containing proteinaceous materials are treated with at least 0.5 mole of trivalent aluminum for each mole of phytate and phytic acid present in the material. The trivalent aluminum will readily react with the protein complexed phytate and phytic acid components. Slightly more than 4 moles trivalent aluminum will generally be required to convert each mole of phytate and phytic acid. Amounts exceeding the stoichiometric requirements (e.g. 4.2 moles or higher) may be added to the phytate-containing proteinaceous materials, if desired, but are generally undesirable for nutritional reasons. Excessive trivalent aluminum addition may adversely affect the metabolism and bioavailability of phosphorous compounds.

The aluminum treatment and conversion of the phytate and phytic acid components to aluminum phytate impart numerous beneficial changes. The treatment alters the physical, chemical, nutritional and functional properties of the protein constituents. Due to the diversity of effects imparted upon the proteinaceous material, the extent with which the proteinaceous materials are treated with the trivalent metals will primarily depend upon the particular transformation or effect desired in the finished product. Phytate and phytic acid treatment with less than one mole trivalent aluminum (e.g. about 0.5 mole or more) will beneficially alter the protein properties. Significant nutritional and functional improvements arise when 25% to 50% of the phytate and phytic acid content is treated with the aluminum ion with exceptional results being achieved above the 50% treatment (i.e. 2 moles trivalent aluminum and higher) levels. Accordingly, for most applications, the phytate and phytic acid-containing proteinaceous materials are advantageously treated with about 2 to about 4 moles of trivalent aluminum for each phytate and phytic acid mole and most typically at about 2 to about 3 trivalent aluminum molar equivalents.

The invention affords a plurality of processing alternatives for treating and converting proteinaceous materials into products of a low protein-phytate complex content. The trivalent aluminum may be introduced into the phytate-containing proteinaceous material at various manufacturing stages. The invention broadly contemplates processing alternatives ranging from physically admixing the phytate-containing protein material with the necessary level of trivalent aluminum reactant to treatment in a suitable solvent media. Under physical admixing conditions, the protein-phytate complex reduction will normally be completed by either the ultimate consumer, an intermediate formulator or processor.

In the preferred embodiments of the invention, the phytate-protein complex treatment is conducted in a solvent system. Water-soluble trivalent aluminum salts or precursors are appropriately utilized for aqueous solvent processes while the water-insoluble trivalent aluminum compounds (e.g. acetate, butoxide, ethoxide, propoxide, lactate, citrate, oleate, phenoxide, stearate, etc., salts of trivalent aluminum) are more appropriate in lipophillic solvent systems. If desired, it may be conducted concurrently with the defatting operation or incorporated as a processing additive to the defatted seed, concentrate or isolate manufacture. In defatting operations, the trivalent aluminum may be added to the full fat seed materials or the oil extracting solvent system. The aluminum treatment may be integrated into conventional leguminous seed material processes in which lipophilic components (e.g. oil) are extracted with lipophilic (e.g. hexane, heptane, etc.) and polar organic solvent (e.g. lower alcohols such as ethanol) combinations or azeotropic mixtures.

The treatment is most advantageously conducted with solvent systems in which both the trivalent aluminum ion and phytate possess sufficient solubility to measurably reduce the protein-phytate complex content of the proteinaceous material. A variety of organic, inorganic solvents and solvent admixtures may be used to solubilize at least a portion of the phytate, phytic acid and trivalent aluminum reactants. Illustrative organic solvents include the alcohols (monohydric and polyhydric alcohols) ketones, ethers, aldehydes, esters, diethylene oxide, dimethyl formamide, dimethyl sulfoxide, mixtures thereof and the like. Exemplary inorganic solvent systems include water, carbon dioxide, sulfur dioxide, mixtures thereof and the like. The organic and inorganic solvents may be used separately or combined with one another with or without non-polar solvents such as hexane, heptane, etc.

In the preferred embodiments, the manufacture is conducted in the presence of a polar solvent for the trivalent aluminum and the phytate and/or phytic acids. Aqueous solutions, [with or without water-soluble polar solvents such as lower alcohols (e.g. $C_1$-$C_4$ alcohol)] are advantageously used as a polar solvent. Certain trivalent aluminum salts and precursors are soluble in aqueous organic solvent systems such as aqueous alcohol. Similarly, phytic acid and phytate are soluble in certain aqueous organic solvent systems which contain relatively small amounts of water (e.g. 95% alcohol). Since most dry proteinaceous materials typically contain about 10-20% water, the proteinaceous material itself may serve as a water source for these aqueous organic solvent systems. The ability to effectively reduce the protein-phytate complex content in the presence of aqueous organic solvent systems which limit or inhibit protein solubility may be used to advantage in the manufacture of defatted or seed protein concentrates. Solvent systems which solubilize the seed protein are used to advantage in the manufacture of protein isolates and modified protein isolates.

In aqueous solution, the phytate treatment with the trivalent aluminum to aluminum phytate is normally conducted at a pH less than 10.0 and advantageously at a pH 8.5 or less. The solubilization of protein-phytate complexes with aluminum ion is most effectively accomplished by dissolving the proteinaceous material in water in the presence of the trivalent aluminum ion at an acid pH (i.e. pH 7.0 or less). At an acid pH, the aluminum ion rapidly converts the protein-phytate complexes into a water-soluble reaction product. Although the phytate and trivalent aluminum ion will proceed rapidly above the protein pI, definitive processing and product advantages are obtained by adjusting the aqueous proteinaceous material slurry or solution to a pH below the protein pI. In the preferred embodiments of the present invention, the proteinaceous material is treated with trivalent aluminum ion at a pH of about 1.0 to about 6.0 and most preferably at a pH of about 2.0 to about pH 4.0.

A variety of organic and inorganic acids may be used for the pH adjustment. The adjusting acid should not inhibit the conversion of the protein-phytate complexes into water-soluble constituents below the protein pI.

Adjusting acids which degrade or decompose the protein constituents are generally avoided. Illustrative pH adjusting acids which may be effectively used to adjust the proteinaceous slurry or solution to a more acid pH level include sulfuric, sulfurous and sulfurous acid precursors (e.g. $SO_2$), hydrochloric, acetic, phosphorous, phosphoric, propionic acids, mixtures thereof and the like.

Acid-soluble trivalent aluminum ions may be effectively used to convert the acid-insoluble protein/phytate complexes into water-solubles. Any aluminum-containing compound capable of providing the trivalent aluminum ion requirements and converting the protein-phytate complexes into water-solubles under the acid processing conditions herein may be used as a trivalent aluminum ion source. Acid-soluble, aluminum compounds such as the acetates, chlorates, chlorides, florides, iodates, sulfates, sulfites, hydroxide, oxides, phosphates, phosphatides, nitrates, nitrites, mixtures thereof and the like are exemplary trivalent aluminum ion sources.

In commercial operations, it is advantageous to increase the protein solids level in isolate manufacture to the highest possible level. The trivalent aluminum ion treatment substantially reduces the protein solution viscosity which permits the manufacture of unmodified and modified isolates to operate at a considerably higher solids level than normal.

The conversion transforms protein-phytate complexes that are normally water-insoluble at a pH 3.5 into aluminum complexes soluble in water a pH 3.5 or less. The conversion reaction does not require external heat but heat may be applied, if desired, to alter the physical and functional properties of the processed material such as disclosed in U.S. Pat. No. 4,234,620 by Howard et al. The aluminum treatment may be broadly effectuated at temperatures ranging from slightly above the treating media freezing point up to the protein decomposition temperature. For most operations, the trivalent aluminum treatment will typically be conducted at a temperature ranging from about 15° C. to about 300° C. and most generally from about 20° C. to about 250° C.

The aluminum treatment provides many unexpected benefits which heretofore could not be accomplished under conventional manufacturing processes. The aluminum treatment generally enhances and improves upon the processing, functional and nutritional characteristics of the proteinaceous materials. Certain of these benefits are of general applicability, while others are particularly adapted for the manufacture of isolates, fractionated isolates or modified protein products. Benefits of general applicability include an enhancement in native protein characteristics, protein digestibility, essential metal bioavailability, fluidity or low viscosity, acid-solubility, effective thermophilic microbe and trypsin inhibition reductions, flavor and color. Benefits inuring to isolate manufacture include significantly higher protein yields, ease of preparing, separating, fractionating, enzymatically modifying and/or recovering protein product. The aluminum treatment uniquely alters the compositional and functional characteristics of the treated proteins. The treated products possess many of the desirable attributes of proteins essentially free from phytate and phytic acid while retaining the desired native protein characteristics.

Heretofore relatively severe heat treatments were deemed necessary to inactive the trypsin inhibition factors. The excessive thermal inactivation temperatures typically exceeded the thermal stability of the protein. These severe inactivating temperatures denature and degrade the vegetable protein. The present invention affords multiple benefits in overcoming the trypsin inhibition problems. The aluminum ion treatment effectively reduces trypsin inhibition levels without denaturing or degrading the treated protein. Trypsin inhibition reduction can be accomplished without subjecting the protein to heat-degrading temperatures. Products containing the trypsin inhibiting factors may be converted into products of substantially reduced trypsin inhibiting factors by treating the contaminated products with aluminum under ambient conditions.

Another significant product and processing advantage arises from the effect the trivalent ion treatment has upon reducing the solution viscosity of phytic acid or phytate-containing proteinaceous materials. This solution viscosity reduction apparently arises through restructuring of protein molecules into a less viscous form. The viscosity reduction attributes permit the proteinaceous material manufacturer or the formulating user to significantly increase the protein solids concentration.

Another important beneficial effect is the enhanced digestibility of the aluminum-treated proteins. This improved digestibility apparently arises because the aluminum treatment restructures the phytate-protein complex into a molecular configuration more accessible to enzymatic attack. The digestibility effect upon 7S soy globulin is pronounced. The aluminum treatment enhances 7S globulin pancreatic digestion by a 3-5 fold factor. Similarly, pepsin and other proteolytic digestions are appreciably promoted by the aluminum treatment. The aluminum treatment results in a substantial enhancement of the protein nutritional quality and digestibility.

Another unexpected benefit inuring to the treatment of the phytate-containing proteinaceous materials with trivalent aluminum is the substantial reduction in microbial contamination. Such reductions may be obtained even though the operational processing temperatures are conducted below the temperatures traditionally considered necessary for effective microbial reduction. This is particularly advantageous since the higher traditional temperatures tend to denature or degrade vegetable proteins. This improvement permits the manufacturer to process the product over a much broader temperature range than the traditional methods.

Avoidance of the complexing effect of essential minerals (e.g. zinc, magnesium, calcium, chromium, iron, copper, selenium, etc.) with phytate is another advantage afforded by the present invention. Reducing dietary deficiencies caused by such mineral complexing and the ability to effectively use the aluminum treated phytate-containing proteins in formulations which require the presence of such minerals in the uncomplexed or biologically available form, beneficially enhance the functional and nutritional utility of the proteinaceous material.

Vegetable proteins are generally comprised of a mixture of diverse proteins of varying molecular weight distribution and pI values. The 7S and 11S proteins constitute the major protein constituents of many proteinaceous materials such as soy protein. The 7S soy protein has a greater affinity to form protein-phytate complexes than the 11S constituent. The pI for the 7S is within the pH 4.0–5.0 range while a broader pH 4.0–6.0 range generally applies to the 11S protein. It is known that phytate and phytic acid form water-insoluble complexes at pH levels below the isoelectric point (pI) of the protein. The trivalent aluminum treatment renders these protein-phytate complexes water-soluble below the pI of the protein. The trivalent aluminum ion treatment also effectuates an increase in the pI by approximately a 0.5–1.0 pH unit. Conventional isolation and fractionation processes are hampered by low yields below the pI even though the functional and nutritional values of protein product will be significantly improved by operating the manufacturing process at these more acid pH levels. The present invention overcomes this problem by permitting the manufacture to be conducted below the pI without sacrificing recoverable protein yields.

The removal of indigenous phytates and phytic acid components from vegetable proteinaceous materials is difficult and costly. In commercial operations, it is generally economically infeasible to remove these components. As a result, the phytate and phytic acid components are normally available to form complexes which are insoluble at or below the pI of the proteins. This often renders the phytate-containing proteinaceous material unfit for use in products formulated below the protein pI. Since the aluminum treatment overcomes the protein phytate complexing problem, the products of this invention may be effectively utilized in a wide variety of industrial, agricultural, food, pharmaceutical, personal care products which require a formulating or usage pH below the protein pI. The aluminum treatment generally shifts the protein pI towards the more neutral pH level by approximately a 0.5–1.0 pH unit and narrows the acid precipitating range. This permits the aluminum-treated protein products to be used as a water-soluble protein additive over a broader acid pH range than traditional proteins.

The desirability of extracting proteins at a pH below the pI has been long recognized but often considered commercially impractical because of excessively poor protein yields. The aluminum treatment embodiment of this invention permits the protein isolate, isolated protein fractions and enzymatically modified protein manufacturer to operate at pH levels below the pI level and obtain exceptionally high recoverable protein yields. The aluminum treatment converts the normally acid-insoluble protein-phytate complexes into an acid soluble protein product. Under the present invention, the aluminum treated, water-soluble protein components are recoverable along with those proteins which are normally water-insoluble and complexed with the phytate acid and phytates. The ability to effectively recover essentially all of the acid-precipitable proteins results in a substantial increase in protein yields.

The invention also enhances the flavor and color quality of the processed product. The adverse flavoring and coloring components are typically removed by treating the protein material with a water-miscible solvent (e.g. ethanol) to partially remove or extract these adverse components. Soybean meals, concentrates and isolates subjected to the trivalent aluminum treatment are equal to or better in color and flavor than those obtained by the alcoholic extraction methods.

As evident from the aforementioned, the aluminum treatment substantially alters the physical, chemical, functional, compositional and metabolic characteristics of the proteinaceous materials. The deleterious effects caused by the phytic acid and phytates in proteinaceous materials are alleviated by the aluminum treatment. As a result, the aluminum treated vegetable proteins are converted into a protein which possess improved functional and nutritional utility and quality over untreated proteins.

The present invention is advantageously adapted to the manufacture of protein concentrates and isolates. In the manufacture of isolates, the aluminum treatment may be effectively applied to unfractionated isolates, fractionated isolates and enzymatically or acid-hydrolyzed vegetable protein products. As previously mentioned, the presence of the aluminum ion enhances the solubility and extractability of proteins from defatted, phytate-containing seed materials. Incorporation of the water-soluble aluminum ions at a pH below the protein pI solubilizes the water-insoluble protein-phytate complexes and permits their effective recovery by conventional means such as an isoelectric pH adjustment. In a typical operation, a defatted protein seed material containing complexed carbohydrates, phytic acid and/or phytate is slurried in water with an effective amount of trivalent aluminum ions at a pH below the pI of the major protein constituents (e.g. less than pH 4.0), the water-soluble constituents (including the proteins) are extracted from the proteinaceous material, separated from the water-insoluble residue and recovered from the water-solubles. In the recovery step, the acid-precipitable, water-soluble protein may be effectively isolated from the non-precipitable extractants by adjusting the pH to the protein pI and separating by conventional techniques.

Definitive processing advantages may also be achieved by conducting the fractionation of phytate-containing vegetable proteins in the presence of trivalent aluminum ions. Under conventional fractionation processes, the complexing of phytate or phytic acid with the proteins masks the normal isoelectric precipitation point of the diverse protein fractions. Effective fractionation of the 7S and 11S protein is complicated by overlapping precipitation ranges which makes it difficult to avoid 7S and 11S mixtures. By incorporating trivalent aluminum ions into the fractionation medium, the isoelectric precipitating range is narrowed to a manageable level which, in turn, permits a cleaner fractionation between the 7S and 11S proteins. A substantial increase in fractionated protein yields is accomplished through reduction of the insoluble protein-phytate complexes.

Effective fractionation of vegetable protein 7S and 11S proteins may be accomplished by initially extracting or isolating the 7S from a protein mixture by an isoelectric pH adjustment (e.g. about pH 5.0–6.0). Conventional techniques may be used for separating and recovering the precipitated fractions from the soluble fractions. In an integrated protein extraction and fractionation operation, it is advantageous to extract the 7S fraction from a precipitated protein mixture by a pH 5.0–5.5 (preferably at about pH 5.1–5.3) adjustment followed by its recovery (e.g. isoelectric precipitation at about a pH 4.2 to about 4.5 or spray-drying). The 11S residues may then be isolated and recovered by conventional techniques.

The ability to more effectively digest or enzymatically modify aluminum-treated proteinaceous materials applies, in general, to all phytate-containing proteinaceous materials. It is suitably adaptable to the manufacture of enzymatically modified protein products and particularly to enzymatically modified soy protein isolates including fractionated soy proteins. Enzymatically modified 7S protein fractions prepared in accordance with this invention may effectively be used to replace egg albumin. The enzymatically modified 11S proteins are useful in foaming or whipping applications.

Most proteinases of a non-vegetable origin require polyvalent metal ion cofactors or activators to effectively hydrolyze protein substrates. These cofactors or activators form a complex with the proteinase molecule at its active site or allosteric binding site and contribute to its enzymatic activity and stability. In phytate and phytic acid-containing systems, the phytate and phytic acid readily form metal complexes with such polyvalent metal ions. This results in a depletion of the enzymatic polyvalent metal ion requirements which causes enzymatic inactivation or a reduction in activity. By including aluminum ions within the enzymatic system, the aluminum effectively functions as a scavenger and chelating agent for the phytic acid and phytate contaminants. The bioavailability of such essential metal ions in the aluminum-treated protein systems of this invention thus permits effective hydrolysis of vegetable proteins by these proteinases.

Conventional proteolytic enzymes which alter or modify proteins, are generally applicable to the aluminum-treated proteinaceous materials of this invention. Such proteolytic enzymes are generally classified as Class 3.4 hydrolases by Enzyme Nomenclature (1972).

Within the class 3.4 protease, enzymes of non-vegetative plant origin (e.g. bacterial, animal, mammals, poultry, fish, fungi, etc.) normally require certain trace minerals for effective protease activity. The serine proteinase, acid proteinase and metalloproteinase respectively of class 3.4.21, 3.4.23 and 3.4.24 are typical proteinases which require trace metals. Illustrative 3.4.21 serine proteinases include chymotrypsin 3.4.21.1, chymotrypsin C 3.4.21.2, trypsin 3.4.21.4, thrombin 3.4.21.5, plasmin 3.4.21.7, Aspergillus alkaline proteinase 3.4.21.15, etc. The 3.4.23 acid proteinases include proteinases such as Pepsin A (3.4.23.1), Pepsin B (3.4.23.2) and Pepsin C (3.4.23.3), Chymosin (3.4.23.4), Cathepsin D (3.4.23.5), Aspergillus acid proteinase (3.4.23.6), Penicillium janthinellum acid proteinase (3.4.23.7), yeast proteinase A (3.4.23.8), Rhizopus acid proteinase (3.4.23.9), Endothia acid proteinase (3.4.23.10), mixtures thereof and the like.

Illustrative 3.4.24 metalloproteinases include Crotalus atrox proteinase (3.4.24.1), Sepia proteinase (3.4.24.2), microbial metalloenzymes (3.4.24.4), such as Bacillus subtilis, Aeromonas proteolytica, Thermolysin (Bacillus thermoproteolyticus), Proteinase aeruginosa, Aspergillus oryza, Aspergillus niger, mixtures thereof and the like.

A major problem confronting the manufacturer of (enzymatically modified) 7S protein with fungal proteases is low yields of recoverable product. The aluminum-treatment embodiments of this invention significantly enhance the level of 7S protein placed in solution, effectiveness of the 7S fractionation and hydrolysis of the 7S protein with fungal proteases. These factors contribute to a substantial increase in recoverable yields of such enzymatically modified 7S proteins.

The enzymatic hydrolysis of the aluminum-treated proteinaceous material may be conducted in a conventional manner by dissolving the proteins in water adjusted to the appropriate hydrolyzing temperature and pH, hydrolyzing the dissolved protein with an effective amount of the proteinase to convert the proteins to the desired protein hydrolyzate and recovering the protein hydrolyzate by conventional recovery techniques.

EXAMPLE 1

In this Example, the effect of proteinases upon aluminum chloride in phytate-containing vegetable protein substrates was studied. Proteolytic enzyme amounts and hydrolyzing pH levels used in this study included pepsin (465 units/mg.) at pH 2.3, pancreatin (Grade II) at pH 8.6, aspergillus niger[1] protease (0.32 units/mg.) at pH 2.8, papain (0.4 units/mg.) at pH 7.5, Streptomyces griseus proteinase (5.4 units/mg.) at pH 7.5, thermolysin (54 units/mg.) at pH 7.5, and bromelain (1.7 units/mg.) at pH 7.5. The proteinaceous substrate included a defatted soy flour[2], a 8-12 NSI soy protein concentrate[3], a 65 NSI soy protein concentrate[4], a 7S soy protein isolate (7S globulin) prepared in accordance with Example 1 of U.S. Pat. No. 4,189,399 by Shemer, a 100 NSI soy protein isolate and a pepsin modified 7S soy isolate prepared by hydrolyzing the 7S protein at pH 2.3 with 1% pepsin of 1:10,000 activity at 43° C. and isolated as a precipitate by pH 4.3 adjustment.

[1] Milezyme AFP, sold and distributed by Miles Laboratories, Inc. Elkhart, Ind.
[2] I-200 defatted soy flour (53-55% soy protein) manufactured and sold by A. E. Staley Manufacturing Company, Decatur, Ill.
[3] STA-PROCON® soy protein concentrate (70% soy protein) manufactured and sold by A. E. Staley Manufacturing Company, Decatur, Ill.
[4] STA-PRO ™ high NSI soy protein concentrate (69% soy protein, 5% moisture, 1% fat, 6.5% ash), manufactured and sold by A. E. Staley Manufacturing Company, Decatur, Ill.

The control samples (i.e. without $Al^{+++}$) were slurried in water (20° C.) at a 2% solids concentration, adjusted to the appropriate hydrolyzing pH (3.0 N HCl or 5.0 N NaOH) for the proteinase and digested. Samples of the supernatant digest (0.5 ml) were periodically withdrawn at the designated time interval for analysis. Effectiveness of the digestive system was determined by adjusting the samples to a final concentration of 9% trichloroacetic acid and analyzing the supernatant for soluble peptide content. The aluminum treated samples were handled in an identical manner except that 1 gram of aluminum chloride was added to the digestive system for each 100 grams of proteinaceous material.

The results of this digestive study are tabulated in Table 1.

TABLE 1

| Proteinase %** | Protein Substrate | Soluble Protein ($\Delta OD280$) at Designated Time | | | |
| --- | --- | --- | --- | --- | --- |
| | | 0 Min. | 10 Min. | 20 Min. | 30 Min. |
| Pepsin 0.3% | High NSI Concentrate | | | | |
| | (1) $Al^{+++}$ treated | 0 | 0.089 | 0.147 | 0.232 |
| | (2) Untreated | 0 | 0.037 | 0.086 | 0.162 |
| 0.3% | Low NSI Concentrate | | | | |
| | (3) $Al^{+++}$ treated | 0 | 0.034 | 0.070 | 0.102 |
| | (4) Untreated | 0 | 0.016 | 0.037 | 0.051 |
| 0.5% | Pepsin Modified 7S | | | | |
| | (5) $Al^{+++}$ treated | 0 | 0.026 | 0.058 | 0.096 |
| | (6) Untreated | 0 | 0.008 | 0.012 | 0.021 |

TABLE 1-continued

| Proteinase %** | Protein Substrate | Soluble Protein (ΔOD280) at Designated Time | | | |
|---|---|---|---|---|---|
| | | 0 Min. | 10 Min. | 20 Min. | 30 Min. |
| 0.5% | 100 NSI Soy Isolate | | | | |
| | (7) Al+++ treated | 0 | 0.009 | 0.059 | 0.098 |
| | (8) Untreated | 0 | 0.000 | 0.013 | 0.076 |
| Pancreatin | Pepsin Modified 7S | | | | |
| 0.5% | (9) Al+++ treated | 0 | 0.175 | 0.274 | 0.335 |
| | (10) Untreated | 0 | 0.041 | 0.074 | 0.104 |
| 0.5% | 7S Globulin | | | | |
| | (11) Al+++ treated | 0 | 0.050 | 0.064 | 0.076 |
| | (12) Untreated | 0 | 0.019 | 0.000 | 0.018 |
| Acid Fungal | Pepsin Modified 7S | | | | |
| Protease | (13) Al+++ treated | 0 | 0.082 | 0.098 | 0.104 |
| 2.8% | (14) Untreated | 0 | 0.020 | 0.036 | 0.041 |
| Ficin | Pepsin Modified 7S | | | | |
| 0.7% | (15) Al+++ treated | 0 | 0.005 | 0.008 | 0.050 |
| | (16) Untreated | 0 | −0.029 | −0.051 | 0.031 |
| Themolysin | Pepsin Modified 7S | | | | |
| 0.025% | (17) Al+++ treated | 0 | 0.005 | 0.029 | 0.052 |
| | (18) Untreated | 0 | 0.000 | 0.000 | 0.028 |
| Streptomyses | Pepsin Modified 7S | | | | |
| griseus | (19) Al+++ treated | 0 | 0.036 | 0.080 | 0.122 |
| 0.3% | (20) Untreated | 0 | 0.000 | 0.040 | 0.076 |
| Papain | Pepsin Modified 7S | | | | |
| 0.6% | (21) Al+++ treated | 0 | −0.050 | −0.052 | 0.000 |
| | (22) Untreated | 0 | −0.010 | −0.010 | −0.046 |
| Subtilysin | Pepsin Modified 7S | | | | |
| carlsberg | (23) Al+++ treated | 0 | −0.150 | −0.102 | −0.084 |
| 0.025% | (24) Untreated | 0 | −0.150 | −0.116 | −0.096 |
| Bromelein | Pepsin Modified 7S | | | | |
| 0.2% | (25) Al+++ treated | 0 | −0.073 | −0.120 | −0.064 |
| | (26) Untreated | 0 | −0.075 | 0.010 | −0.080 |

**Proteinaceous Material Dry Weight Basis

As illustrated by the tabulated data above, the aluminum treatment substantially increases proteolytic digestability. The digestibility effect with proteases requiring polyvalent metal ions for enzymatic activity is very pronounced. In contrast, the effect upon non-metal activated protease (e.g. sulfydryl active site protease such as papain and bromelein or the serine active site, proteases such as subtilysin carlsberg) is less. The preferential complexing effect between the aluminum and phytate apparently releases essential polyvalent metal activators for complexing with the proteolytic enzymes.

The pepsin-modified 7S isolate is a residue product of pepsin digestion. This predigested protein material is considerably more resistant to proteolytic hydrolysis than conventional vegetable protein isolates or isolated fractions. The data illustrates that the aluminum treatment renders such difficult to hydrolyze proteinaceous material readily digestible by metal activated proteases. The data also indicates protein efficiency of vegetable proteins for agricultural and human feeding applications may be appreciably increased by treating vegetable proteins with aluminum. Digestion rates with proteolytic enzymes indigenous to animals under acid, alkaline and neutral digestive conditions are greater than with the untreated proteinaceous materials.

EXAMPLE 2

Runs A-C of this example illustrate the efficacy of the aluminum treatment in preparing enzymatically modified soy albumins. Runs A and C were conducted upon aluminum-treated substrates and Run B without aluminum treatment.

The substrate used for the proteolytic digest of Run A was prepared by washing soy grits[4] with water adjusted to a pH 4.3–4.4 (4.9 N HCl). The wash extracted approximately 63% of the pH 4.3–4.4 solubles (sugars, whey proteins, etc.) from the grits. The washed grits where then slurried in 30° C. water (solvent to grit weight ratio of 10:1) adjusted to a pH 2.0 with 20° Bé N HCl. One and one-half (1½) grams of aluminum chloride for each 100 grams of protein (d.s.b.) were then added to the slurry. The slurry was continuously stirred for 90 minutes at a slow speed. The Run A slurry was then heated to 45° C. and adjusted to pH 2.6 with 5.0 N sodium hydroxide.

[4]Staley Medium Soy I-Grits

The Run A substrate was digested with acid fungal protease[5] (600 MAPU/G protein) at a level equivalent to 1% protein weight (d.s.b.), pH 2.8–2.85, 45° C. and slowly stirred for three hours while metering sufficient 20° Bé N hydrochloric acid into the digest to maintain the digest at a pH 2.8–2.85. The digestion was then continued for an additional 16-hour period during which time the pH was permitted to slowly drift from pH 2.85 to pH 3.1.

[5]Milezyme$^R$ AFP—acid fungal protease produced by a selected strain from *Aspergillus niger* genus—Marschall Division, Miles Laboratories, Inc., Elkhart, Indiana 46514

The slurry solids were separated from solubles by filtering through a plate and frame filter press equipped with polypropylene cloths precoated with pearlite filter aid. The clear filtrate was adjusted from a pH 3.0 to pH 4.1 with 5 N sodium hydroxide. The pH 5.1 filtrate was spray-dried in a vertical laboratory spray dryer operated at 175°–232° C. inlet and 71°–77° C. outlet temperatures.

A spray-dried, enzymatically modified soy albumin (Run B) was prepared under the identical conditions except for omission of the aluminum chloride addition.

In Run C, a predigestion with a protease derived from *Bacillus subtilis*[6] was conducted prior to digestion with acid fungal protease. The procedure of Run A was modified in Run C by initially adjusting the washed grit slurry (10:1 solvent to grit ratio) of Run A to a pH 8.0 with 5.8 N sodium hydroxide. The pH 8 slurry was then digested for one hour with the alkaline protease (0.25 enzyme g/100 g protein) under slow stirring while allowing the pH to slowly drift to pH 6.8. The alkaline protease hydrolyzed digest was adjusted to a pH 3.0 with 4.9 N hydrochloric acid followed by the addition of 2.36 grams of $Al_2(SO_4)_3.16H_2O$ for each 100 grams protein. The digest containing the added aluminum sulfate was then stirred for one hour (pH drift from 3.0 to 2.85). Enzymatic modification was completed by adding 0.5 grams of Miles AFP enzyme[7] (1000 SAPU/G activity) for each 100 protein grams (d.s.b.), adjusting to a pH 2.8 with 20° Be hydrochloric acid and digesting the protein at 40° C. for 21 hours. The solubles were then separated from the insolubles and spray-dried in the same manner as Run A.

[6] Rohm & Haas P-53 (35,496 CSU/g)
[7] 5 Supra

The enzymatically modified soy albumin yield for Run A was 83.6% as opposed to 52.7% for Run B, and 80.6% for Run C.

The enzymatically modified soy albumins were used as whipping agents to prepared frappé. The spray-dried whipping agents of Runs A and C (i.e. aluminum-treated runs) yielded low-density frappés of a smooth, creamy consistency with good foam stability, appearance, peaking and organoleptic qualities.

EXAMPLE 3

This example illustrates the enhancement of protein solubility by treating vegetable proteins with trivalent aluminum. Duplicate slurries of 10 grams soy grits[8] in 140 grams water were prepared. To one of the slurries there was added 0.12 grams of $AlCl_3$ and 0.3 gram of NaCl to the other. The sodium chloride and aluminum chloride samples were of equivalent ionic strength. Each sample was adjusted and maintained at pH 2.5 with continuous slow stirring for 45 minutes.

[8] 2 Supra

The slurries were then centrifuged and the protein content of the supernatant determined by Coomassie Dye Binding technique (cf. U.S. Pat. No. 4,023,933).

An $AlCl_3$:NaCl assay ratio determination of 1.2 revealed the aluminum-treated sample contained 20% more water-soluble proteins than the sodium chloride solution sample.

EXAMPLE 4

Three identical slurries (pH 2.0) of a soy protein concentrate[9] were prepared at a 20% solids level. To the first sample there was added (on a dry soy concentrate weight basis) 1% $AlCl_3$, 3% NaCl to the second sample and no salt addition to the third control sample. The samples were allowed to stand for 15 minutes at room temperature and the pH for each sample was adjusted to 7.8. The Brookfield viscosities were determined with the following results:

|  | Viscosity (CPS) |
|---|---|
| NaCl treated | 1250 |
| $H_2O$ treated | 1100 |
| $AlCl_3$ treated | 400 |

[9] 3 Supra

As evident from the above viscosity determination, the aluminum chloride-treated sample showed about a 64% increase in viscosity in comparison to the sodium chloride-treated sample which increased the viscosity about 10% compared to the control sample.

Each sample was then centrifuged and the supernatants assayed for soluble protein by Coomassie Dye Binding technique.

|  | Soluble Protein Relative to Water-Treated Sample |
|---|---|
| NaCl treated | 1.05 |
| $H_2O$ treated | 1.00 |
| $AlCl_3$ treated | 1.93 |

Upon the basis of the above assays, the aluminum treatment yielded a 93% increase in water-soluble protein over the control and 88% more soluble protein than the sodium chloride-treated sample.

Samples of high NSI soy protein concentration[10] were prepared at 15% solids concentration (d.s.b.) with and without 1% $AlCl_3$ (concentrate dry weight basis). The samples were adjusted to pH 7.4 with 1 N NaOH. The Brookfield viscosities were determined with the following results:

|  | Viscosity (CPS) |
|---|---|
| Control sample | 950 |
| Aluminum treated | 100 |

[10] 4 Supra

Again, the significantly lower protein solution viscosities for the aluminum-treated samples are self-evident.

EXAMPLE 5

Samples of a high NSI soy concentrate[11] were prepared with and without the addition of 0.5% aluminum chloride on a concentrate dry solids weight basis. Thermophile determinations were performed upon the samples. The control sample (without added aluminum) had a thermophile count (4950/10 g), which was about eight times more than the aluminum-treated sample count (620/10 g).

[11] 4 Supra

EXAMPLE 6

Soy protein isolate (7S)[12] samples were prepared with and without the addition of aluminum chloride (1.4%). Solutions of the isolate samples (4% solids d.s.b.) were prepared and adjusted to pH 8.5. To each sample there was then added 0.5 mg of trypsin (10,200 BAEE units/mg) and each sample was digested for 30 minutes. The digestions were monitored by TCS solubles with the following results:

|  | Net Change O.D. 280 nM at 30 Minutes |
|---|---|
| Control | −0.018 |
| Aluminum treated | +0.156 |

[12] Example 1 7S Isolate

The above data indicates that the aluminum treatment reduced trypsin inhibition by the observation that the aluminum treated sample was digested to yield trichloroacetic acid soluble peptides while the control was not.

EXAMPLE 7

This example illustrates phytate content determinations. The phytate content can be determined by biphasic titrations starting at pH 3.0. The endpoint (100% titration) is taken at the intercept of the tangentials to the two phases. The phytate content herein refers to mono- to hexaphospho inositols inclusive. The weight percent phytate of any given proteinaceous material may be calculated from the following equation:

$$\frac{AlCl_3\, l \cdot AlCl_3\, M \cdot (T-A)/A \cdot 660 \cdot 100}{4 \cdot W} = \text{weight \% phytate} \qquad 1$$

wherein $l$ and $M$ respectively represent liters and molarity of the $AlCl_3$ solution, T is total phosphorus (in weight percent), A designates available phosphorous (in weight percent) and W sample weight in grams. The weight percents for total and available phosphorous may be obtained from the published values (e.g. see *Feed Ingredient Analysis Table*, 1977, International Minerals & Chemical Corporation).

To illustrate the application of the determinations, five grams of soy flour was mixed with 100 ml. of water and the pH was adjusted to 3.0 with 1 M HCl. The pH was monitored to the nearest 0.001 pH unit. The sample was titrated with incremental additions of 1.0 ml. aliquots of 0.075 M $AlCl_3$ with the pH being monitored and allowed to equilibrate after each incremental addition. The pH was considered to be equilibrated when there was no change in the 0.001 pH unit reading for 15 seconds. The following titration values were obtained in this determination:

| ml | pH | ml | pH |
| --- | --- | --- | --- |
| 0 | 2.990 | 13 | 2.344 |
| 1 | 2.928 | 14 | 2.318 |
| 2 | 2.864 | 15 | 2.298 |
| 3 | 2.803 | 16 | 2.280 |
| 4 | 2.743 | 17 | 2.263 |
| 5 | 2.685 | 18 | 2.252 |
| 6 | 2.632 | 19 | 2.240 |
| 7 | 2.581 | 20 | 2.230 |
| 8 | 2.533 | 21 | 2.222 |
| 9 | 2.484 | 22 | 2.214 |
| 10 | 2.441 | 23 | 2.208 |
| 11 | 2.405 | 24 | 2.203 |
| 12 | 2.373 | 25 | 2.200 |

The pH versus ml. $AlCl_3$ salts was plotted on standard graph paper and the intercept of the tangentials was determined as 11.3 ml. The total phosphorous content of the soy flour is 0.6% and the available phosphorous is 0.15. On the basis of these values, the weight percent phytate of the soy flour is calculated as follows:

$$\frac{(0.0113) \cdot (0.075) \cdot (0.6 - 0.15)/0.6 \cdot (660) \cdot 100}{4 \cdot (5)} = 2.09\% \text{ weight phytate}$$

In proteinaceous concentrates prepared by aqueous alcohol extraction of water-solubles (e.g. STA-PRO and PROCON of Example 1) and protein isolates, the available phosphorous is removed from the proteinaceous material. In these proteinaceous materials (T-A)/T equals one whereas proteinaceous materials not subjected to aqueous alcohol extraction or isolation processing (e.g. full-fat or solvent-extracted seed materials) typically contain available phosphorous and will yield a phytate corrective factor of less than 1.

Determinations of water-insoluble protein below the isoelectric point of proteins are made by dissolving a 5 gram sample of proteinaceous material of a known protein content in 100 ml. water at 20° C. and adjusting to pH 3.0 with 1.0 N HCl. The protein is moderately agitated for 10 minutes to insure complete dissolution of the water-soluble protein. The resultant protein solution is then centrifuged (5000×g centrifugal force) for 30 minutes, supernatant filtered through Eaton-Dikeman Grade 513, 18.5 cm. fluted filter paper and the filtrate is analyzed for percent protein (Kjeldahl method). The weight percent water-insoluble protein is then determined by the following equation:

% insoluble protein =

$$\frac{(\text{total gms. protein sample-gms soluble protein in solution})}{\text{total grams protein in sample}} \times 100$$

On a comparative basis, the aluminum treatment will reduce the level of insoluble protein. The trivalent aluminum will generally increase water-soluble protein by at least 10% of the pH 3.0 and preferably 20% or more.

What is claimed is:

1. A method for preparing a protein composition of an improved water-soluble protein content at a pH below the isoelectric precipitating pH of the protein from phytate-containing proteinaceous materials, said method comprising treating the phytate-containing proteinaceous material with at least 0.5 mole equivalent of trivalent aluminum for each mole of phytate contained within said material, converting the proteinaceous material with said trivalent aluminum into a protein composition having a measurably higher content of water-soluble protein below the isoelectric precipitating pH of the protein and recovering the protein composition.

2. The method according to claim 1 wherein the proteinaceous material is derived from an oleaginous seed source material.

3. The method according to claim 2 wherein the oleaginous seed source material is at least one member selected from the group consisting of corn seed, leguminous seed material, sunflower seed and rapeseed.

4. The method according to claim 3 wherein the protein source material comprises corn seed.

5. The method according to claim 3 wherein the proteinaceous seed material source is derived from a leguminous seed material.

6. The method according to claim 1 wherein the proteinaceous material comprises a soya protein material.

7. The method according to claim 1 wherein the treatment of proteinaceous material is conducted at a pH of less than 9.0.

8. The method according to claim 2 wherein a phytate-containing proteinaceous material is treated with trivalent aluminum ion at a pH below the isoelectric precipitating pH level of the major protein components of said proteinaceous material.

9. The method according to claim 7 wherein the phytate-containing proteinaceous material is treated with about 1 mole to about 4 mole equivalents of trivalent aluminum.

10. The method according to claim 7 wherein the proteinaceous material consists essentially of a proteinaceous material obtained from oleaginous seeds.

11. The method according to claim 7 wherein an aqueous protein solution is treated with trivalent aluminum ions.

12. The method according to claim 11 wherein the trivalent aluminum comprises from about 2 to about 4 mole equivalents of water-soluble trivalent aluminum.

13. The method according to claim 11 wherein the treated proteinaceous material is hydrolyzed with a protease.

14. The method according to claim 11 wherein the proteinaceous material comprises a defatted leguminous material.

15. The method according to claim 11 wherein the proteinaceous material is treated with at least one mole of trivalent aluminun ion and the protein composition consists essentially of a soy isolate.

16. In a proteinaceous material containing protein and phytate in the form of a protein-phytate complex which is insoluble in water at pH levels below the isoelectric precipitating pH for the protein, the improvement which comprises a proteinaceous material treated with a sufficient amount of trivalent aluminum to measurably increase the level of water-soluble protein at a pH below the isoelectric precipitating pH of the protein.

17. The proteinaceous material according to claim 16 wherein the proteinaceous material consists essentially of a material obtained from an oleaginous seed material.

18. The proteinaceous material according to claim 17 wherein the protein content of proteinaceous material is at least 40% by weight of the material weight and the treated proteinaceous material contains at least one mole equivalent of trivalent aluminum for each mole of phytate contained within said material.

19. The material according to claim 18 wherein the material is derived from an oleaginous seed material source of at least one member selected from the group consisting of corn seed, leguminous seed material and sunflower seed.

20. The material according to claim 18 wherein the proteinaceous material consists essentially of a defatted soy protein.

21. The material according to claim 18 wherein the proteinaceous material consists essentially of a soy concentrate.

22. The material according to claim 18 wherein the proteinaceous material consists essentially of a soy isolate.

23. The material according to claim 18 wherein the proteinaceous material consists essentially of a protease modified soy isolate.

24. The material according to claim 18 wherein the protein content of the treated material is at least 70% by weight of the total material weight and the material contains from about 2 to about 4 mole equivalents of trivalent aluminum ion for each mole of phytate.

25. The material according to claim 24 wherein the protein content is at least 90% by weight of the proteinaceous material weight and substantially free from water-insoluble protein at a pH 3.0.

* * * * *